United States Patent
Lim

(10) Patent No.: US 11,780,427 B2
(45) Date of Patent: Oct. 10, 2023

(54) APPARATUS FOR ASSISTING DRIVING AND METHOD THEREOF

(71) Applicant: HL KLEMOVE CORP., Incheon (KR)

(72) Inventor: Sungyong Lim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 231 days.

(21) Appl. No.: 17/315,663

(22) Filed: May 10, 2021

(65) Prior Publication Data

US 2021/0347354 A1   Nov. 11, 2021

(30) Foreign Application Priority Data

May 8, 2020   (KR) ..................... 10-2020-0054907

(51) Int. Cl.
*B60W 30/08*   (2012.01)
*B60R 21/013*  (2006.01)
(Continued)

(52) U.S. Cl.
CPC .......... *B60W 30/08* (2013.01); *B60R 21/013* (2013.01); *B60W 10/30* (2013.01); *B60W 50/14* (2013.01); *B60R 2021/0011* (2013.01); *B60R 2021/01013* (2013.01); *B60W 2420/52* (2013.01); *B60W 2554/80* (2020.02)

(58) Field of Classification Search
CPC ... B60R 2021/0011; B60R 2021/01013; B60R 21/013; B60W 10/30; B60W 2420/52; B60W 2554/80; B60W 30/08; B60W 50/14; B60W 10/04; B60W 10/18; B60W 10/184; B60W 10/20; B60W 2050/143; B60W 2420/42; B60W 2710/18; B60W 2710/20; B60W 2710/30; B60W 30/085; B60W 30/09; B60W 30/0953; B60W 2554/00; B60T 2201/024; B60T 7/22; B60T 8/17; B62D 15/0265; B62D 6/002; G05D 1/0214; G05D 2201/0213; G08G 1/16; G08G 1/166; G06V 20/58
See application file for complete search history.

(56) References Cited

U.S. PATENT DOCUMENTS 9,381,915 B1 *  7/2016  Crombez ............ B60W 30/095
10,011,194 B1 *  7/2018  Scott .................. B60N 2/42736
(Continued)

FOREIGN PATENT DOCUMENTS

KR   10-2019-0088253 A   7/2019
KR   10-2019-0109850 A   9/2019

*Primary Examiner* — Babar Sarwar
(74) *Attorney, Agent, or Firm* — Hauptman Ham, LLP

(57) ABSTRACT

The apparatus for assisting driving of host vehicle includes a first sensor mounted to the host vehicle and having a field of view in rear of the host vehicle, the first sensor to obtain rear image data; a second sensor selected from a group consisting of a radar sensor and a LiDAR sensor and mounted to the host vehicle, the second sensor to have a field of sensing in rear of the host vehicle and obtain rear detecting data; and a controller to process the rear image data and the rear detecting data. The controller may be determine a possibility of a collision of a rear object located at the rear of the host vehicle based on processing the rear image data and the rear detecting data, and to adjust a seat of the host vehicle to a preset position based on an expected collision of the rear object.

15 Claims, 7 Drawing Sheets

(51) Int. Cl.
  *B60W 10/30*   (2006.01)
  *B60W 50/14*   (2020.01)
  *B60R 21/01*   (2006.01)
  *B60R 21/00*   (2006.01)

(56) References Cited

U.S. PATENT DOCUMENTS

| | | | | |
|---|---|---|---|---|
| 11,077,816 | B1* | 8/2021 | Bates | B60R 21/013 |
| 11,254,272 | B2* | 2/2022 | Tse | B60R 21/0134 |
| 2002/0147535 | A1* | 10/2002 | Nikolov | B60N 2/4214 |
| | | | | 340/425.5 |
| 2005/0283292 | A1* | 12/2005 | Kawato | B60N 2/0276 |
| | | | | 701/45 |
| 2009/0243353 | A1* | 10/2009 | Sakai | B60N 2/42727 |
| | | | | 297/216.1 |
| 2014/0309884 | A1* | 10/2014 | Wolf | B60W 10/184 |
| | | | | 701/41 |
| 2014/0310739 | A1* | 10/2014 | Ricci | G06Q 20/321 |
| | | | | 725/75 |
| 2018/0215338 | A1* | 8/2018 | Faruque | B60R 21/264 |
| 2018/0281730 | A1* | 10/2018 | Nagasawa | B60N 2/75 |
| 2019/0344738 | A1* | 11/2019 | Ga | B60R 21/01516 |
| 2021/0024028 | A1* | 1/2021 | Kanegae | B60R 21/2338 |
| 2021/0213960 | A1* | 7/2021 | Dingli | B60W 40/09 |
| 2021/0229656 | A1* | 7/2021 | Dax | G08G 1/09626 |
| 2021/0323446 | A1* | 10/2021 | Christensen | B60R 21/013 |

* cited by examiner

APPARATUS FOR ASSISTING DRIVING AND METHOD THEREOF

CROSS-REFERENCE TO RELATED APPLICATION(S)

This application is based on and claims priority under 35 U.S.C. § 119 to Korean Patent Application No. 10-2020-0054907, filed on May 8, 2020, the disclosure of which is incorporated herein by reference.

BACKGROUND

1. Field

The disclosure relates to a driver assistance system and a method thereof, and more particularly, to a driver assistance system capable of minimizing damage during a collision by determining a possibility of the collision of a rear vehicle, and a driver assistance method.

2. Description of Related Art

Generally, vehicles are driven on roads or tracks to transport people or goods to destinations. Vehicles are able to move to various locations on one or more wheels mounted onto the frame of the vehicle. Such vehicles may be classified into three-wheel or four-wheel vehicles, a bus, a medium-large truck, a two-wheel vehicle such as a motorcycle, construction machinery, bicycles, trains traveling along rails on tracks, and the like.

To relieve burdens and increase convenience of a driver, recent studies regarding vehicles provided with an Advanced Driver Assist System (ADAS) that actively provides information regarding a state of the vehicle, a state of the driver, and surrounding conditions are actively ongoing.

Examples of the ADAS provided within the vehicle include Smart Cruise Control System, Lane Keeping Assist System, Lane Following Assist and Lane Departure Warning System, and Forward Collision Avoidance (FCA).

On the other hand, a development of a method and apparatus capable of protecting the driver in preparation for a collision of a rear vehicle is slow.

SUMMARY

An aspect of the disclosure provides a driver assistance system capable of protecting a driver from a collision by determining a possibility of the collision of a rear object and adjusting a seat or escaping the driver out of the vehicle, and a driver assistance method.

Additional aspects of the disclosure will be set forth in part in the description which follows and, in part, will be obvious from the description, or may be learned by practice of the disclosure.

According to an aspect of the disclosure, there is provided an apparatus for assisting driving of a host vehicle, the apparatus including: a first sensor mounted to the host vehicle and having a field of view in rear of the host vehicle, the first sensor configured to obtain rear image data; a second sensor selected from a group consisting of a radar sensor and a Light Detection And Ranging (LiDAR) sensor and mounted to the host vehicle, the second sensor configured to have a field of sensing in rear of the host vehicle and obtain rear detecting data; and a controller including a processor configured to process the rear image data and the rear detecting data. The controller may be configured to determine a possibility of a collision of a rear object located at the rear of the host vehicle in response to processing the rear image data and the rear detecting data, and to adjust a seat of the host vehicle to a preset position in response to the collision of the rear object being expected.

The preset position may be set so that a driver of the host vehicle is in close contact with the seat.

The controller may be configured to determine an expected amount of impact due to the collision of the rear object based on a speed and a size of the rear object, and to adjust the seat of the host vehicle to the preset position in response to the expected amount of impact being less than or equal to a preset value.

In response to the expected amount of impact being greater than the preset value, the controller may be configured to open a door of the host vehicle, to separate the seat from the host vehicle, and to escape the separated seat to the outside of the host vehicle through the opened door.

The controller may be configured to open the door of the host vehicle to 90 degrees or more.

The controller may be configured to operate an airbag mounted to the seat in response to escaping the separated seat to the outside of the host vehicle through the opened door.

The controller may be configured to determine the speed of the rear object in response to processing the rear detecting data, and to determine the size of the rear object in response to processing the rear image data.

The controller may be configured to control a user interface of the host vehicle to warn a driver of the collision in response to the collision of the rear object being expected.

The apparatus may further include a third sensor mounted to the host vehicle and having a field of view in front of the host vehicle, the third sensor configured to obtain front image data; a fourth sensor selected from the group consisting of the radar sensor and the LiDAR sensor and mounted to the host vehicle, the fourth sensor configured to have a field of sensing in front of the host vehicle and obtain front detecting data; and a fifth sensor selected from the group consisting of the radar sensor and the LiDAR sensor and mounted to the host vehicle, the fifth sensor configured to have a field of sensing in side of the host vehicle and obtain side detecting data. The controller may be configured to search for an avoidance space to avoid the collision of the rear object in response to processing the front image data, the front detecting data, and the side detecting data, and to control the host vehicle so that the host vehicle moves to the avoidance space.

According to another aspect of the disclosure, there is provided a method for assisting driving of a host vehicle, the method including: obtaining, by a sensor, rear image data and rear detecting data of the host vehicle; processing, by a controller, the rear image data and the rear detecting data; determining, by the controller, a possibility of a collision of a rear object located at the rear of the host vehicle in response to processing the rear image data and the rear detecting data; and adjusting, by the controller, a seat of the host vehicle to a preset position in response to the collision of the rear object being expected.

The preset position may be set so that a driver of the host vehicle is in close contact with the seat.

The adjusting of the seat of the host vehicle to the preset position in response to the collision of the rear object being expected may include determining an expected amount of impact due to the collision of the rear object based on a speed and a size of the rear object; and adjusting the seat of the host vehicle to the preset position in response to the expected amount of impact being less than or equal to a preset value.

The method may further include, in response to the expected amount of impact being greater than the preset value, opening, by the controller, a door of the host vehicle, separating the seat from the host vehicle, and escaping the separated seat to the outside of the host vehicle through the opened door.

The opening of the door of the host vehicle may include opening the door of the host vehicle to 90 degrees or more.

The method may further include operating, by the controller, an airbag mounted to the seat in response to escaping the separated seat to the outside of the host vehicle through the opened door.

The determining of the expected amount of impact due to the collision of the rear object based on the speed and the size of the rear object may include determining the speed of the rear object in response to processing the rear detecting data; and determining the size of the rear object in response to processing the rear image data.

The method may further include controlling, by the controller, a user interface of the host vehicle to warn a driver of the collision in response to the collision of the rear object being expected.

The method may further include obtaining, by the sensor, front image data, front detecting data, and side detecting data; searching for, by the controller, an avoidance space to avoid the collision of the rear object in response to processing the front image data, the front detecting data, and the side detecting data; and controlling, by the controller, the host vehicle so that the host vehicle moves to the avoidance space.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
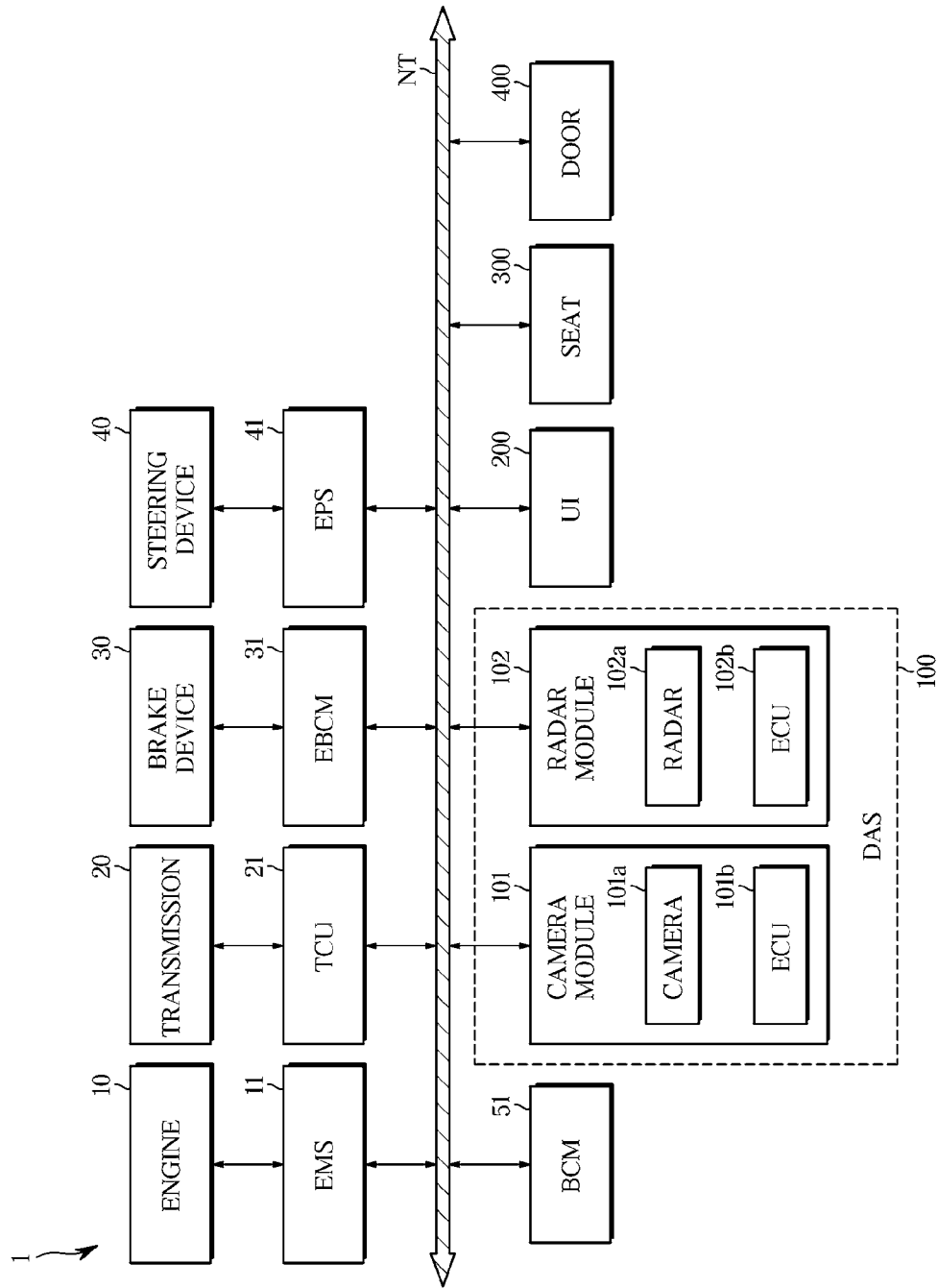
FIG. 1 is a view illustrating a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c. Hereinafter, operation principles and embodiments of the disclosure will be described with reference to accompanying drawings.

FIG. 1 is a view illustrating a configuration of a vehicle according to an embodiment.

Referring to FIG. 1, a vehicle 1 may include an engine 10, a transmission 20, a braking device 30, and a steering device 40. The engine 10 may include a cylinder and a piston, and may generate power for the vehicle 1 to drive. The transmission 20 may include a plurality of gears, and may transmit power generated by the engine 10 to wheels. The braking device 30 may decelerate or stop the vehicle 1 through friction with the wheels. The steering device 40 may change a driving direction of the vehicle 1.

The vehicle 1 may include a plurality of electrical components. For example, the vehicle 1 further includes an engine management system (EMS) 11, a transmission control unit (TCU) 21, and an electronic brake control module (EBCM) 31), an electronic power steering (EPS) 41, a body control module (BCM), a driver assistance system (DAS) 100, a user interface 200, a seat 300, and a door 400.

The EMS 11 may control the engine 10 in response to an acceleration intent of a driver through an accelerator pedal or a request of the DAS 100. For example, the EMS 11 may control torque of the engine 10.

The TCU 21 may control the transmission 20 in response to a shift command of the driver through a shift lever and/or a driving speed of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates a steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The user interface 200 may provide various types of information to the driver of the vehicle 1 in various ways.

For example, the user interface 200 may transmit various information to the driver using visual, auditory, and tactile means.

The seat 300 may be provided inside the vehicle 1 so that passengers including the driver of the vehicle 1 can sit.

The seat 300 may refer to a power seat 300 designed to be adjusted up and down or back and forth using a hydraulic pressure or an electric motor by an electric pump.

The seat 300 may include all of a driver's seat, a passenger's seat, and a rear seat, but for convenience of description, the seat 300 is assumed to be the driver's seat 300.

The seat 300 may be controlled by the BCM 51 or the DAS 100, and the BCM 51 may adjust a position of the seat 300 based on a control signal received from the DAS 100.

The door 400 may refer to an automatic door 400 designed to be automatically opened or closed using the hydraulic or the electric motor by the electric pump.

The door 400 may include all of a driver's side door, a passenger side door, and a rear seat door, but for convenience of description, the door 400 is assumed to be the driver's side door.

The door 400 may be controlled by the BCM 51 or the DAS 100, and the BCM 51 may open the door 400 based on a control signal received from the DAS 100.

The DAS 100 may assist the driver in manipulating (driving, braking, steering) the vehicle 1. For example, the DAS 100 may detect an environment of a road on which the vehicle 1 is driving (e.g., other vehicles, pedestrians, cyclists, lanes, road signs, etc.).

In addition, the DAS 100 may control the seat 300 and/or the door 400 of the vehicle 1 in response to the environment of the road on which the vehicle 1 is driving.

The DAS 100 may provide various functions to the driver. For example, the DAS 100 may include lane departure warning (LDW), lane keeping assist (LKA), high beam assist (HBA), autonomous emergency braking (AEB), traffic sign recognition (TSR), smart cruise control (SCC), and blind spot detection (BSD).

The DAS 100 may include a camera module 101 for obtaining image data around the vehicle 1 and a radar module 102 for obtaining object data around the vehicle 1. The camera module 101 may include a camera 101*a* and an electronic control unit (ECU) 101*b*, and may capture the front of the vehicle 1 and recognize other vehicles, pedestrians, cyclists, lanes, road signs, traffic lights, and the like. The radar module 102 may include a radio detecting and ranging (radar) 102*a* and an electronic control unit (ECU) 102*b*, and may obtain relative positions and relative speeds of objects (e.g., other vehicles, pedestrians, cyclists, and the like) around the vehicle 1.

That is, the DAS 100 may process the image data obtained by the camera module 101 and detecting data (radar data) obtained by the radar module 102, and in response to the processing of the image data and the radar data, the DAS 100 may detect the environment of the road on which the vehicle is driving, a front object located in front of the vehicle 1, a rear object located behind the vehicle 1, and a side object located on the side of the vehicle 1.

The DAS 100 is not limited to that illustrated in FIG. 1, and may further include a Light Detection And Ranging (LiDAR) that scans around the vehicle 1 and detects the object.

The above described electronic components may communicate with each other through a vehicle communication network NT. For example, the electrical components may exchange data therebetween through Ethernet, media oriented systems transport (MOST), Flexray, controller area network (CAN), local interconnect network (LIN), and the like. For example, the DAS 100 may transmit a driving signal, a braking signal, and a steering signal to the EMS 11, the EBCM 31, and the EPS 41, respectively, through the NT.

As another example, the DAS 100 may transmit a control signal for the seat 300 and the door 400, an information output signal, a control signal for the seat 300, and a control signal for the door 400 through the vehicle communication network NT, respectively, to the BCM 51, the user interface 200, the seat 300, and the door 400.

Figure 2:
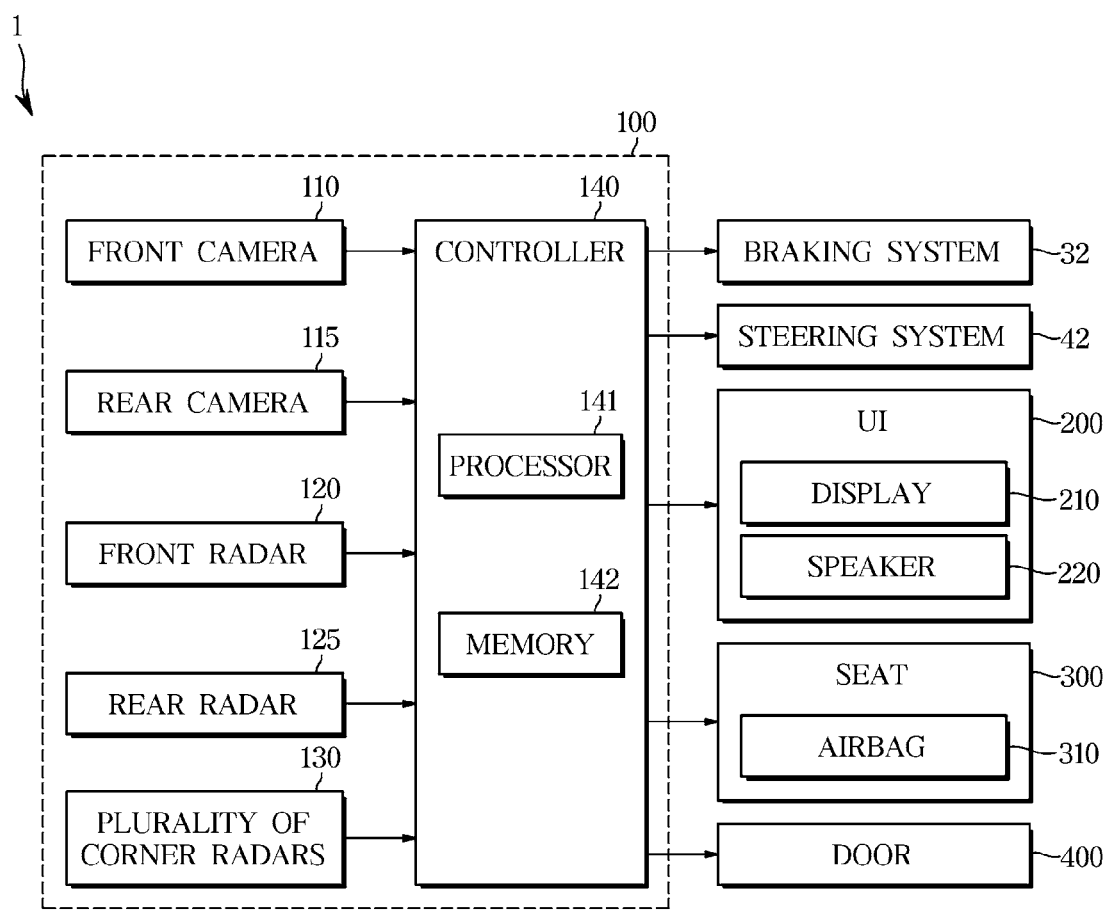
FIG. 2 is a view illustrating a configuration of a driver assistance system according to an embodiment.
Figure 3:
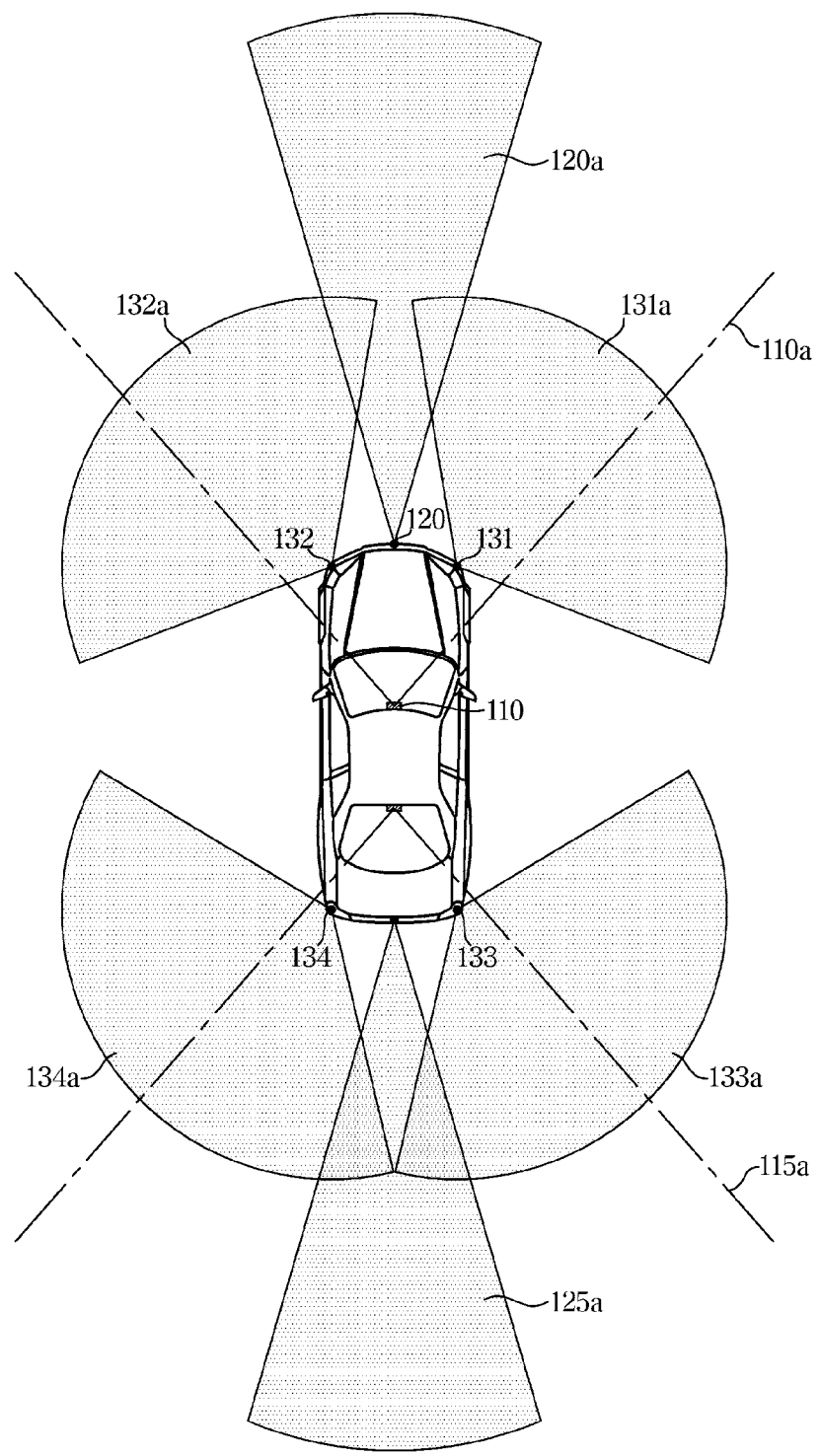
FIG. 3 is a diagram illustrating a camera and a radar included in a driver assistance system according to an embodiment.

FIG. 2 is a view illustrating a configuration of a driver assistance system according to an embodiment, and FIG. 3 is a diagram illustrating a camera and a radar included in a driver assistance system according to an embodiment.

Referring to FIG. 2, the vehicle 1 may include a braking system 32, a steering system 42, the DAS 100, the user interface 200, the seat 300, and the door 400.

The braking system 32 may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The user interface 200 may output information for guiding a start point of an inertial driving to the driver of the vehicle 1 based on the control signal of the DAS 100. The user interface 200 for this may include a speaker 220 that transmits auditory information to the driver and/or a display 210 that transmits visual information to the driver.

The display 210 may output an image warning the driver of a collision based on the control signal of the DAS 100. For example, the display 210 may output a message warning of the collision.

For this, the display 210 may be provided inside the vehicle 1 and may include a panel. For example, the display 210 may be provided in a cluster of the vehicle 1, may be provided across the cluster and a center fascia, may be provided on a ceiling inside the vehicle 1, and may be provided on the door 400 inside the vehicle 1.

The panel may be any one of a cathode ray tube (CRT) panel, a liquid crystal display (LCD) panel, a light emitting diode (LED) panel, an organic light emitting diode (OLED) panel, and a plasma display panel (PDP), and a field emission display (FED) panel.

A position and number of the display 210 may be included without limitation as long as it is a position and number that can visually transmit information to the driver of the vehicle 1.

The speaker 220 may output a sound for warning of the collision based on the control signal of the DAS 100. For example, the speaker 220 may output an emergency warning alarm.

For this purpose, the speaker 220 may be provided inside the vehicle 1, and may be provided without as long as it is a position where the driver of the vehicle 1 can listen to the output sound.

The seat 300 may include an airbag 310 provided on the door 400 side.

When the seat 300 is present on a left side, the airbag 310 may be provided on the left side inside the seat 300.

The seat 300 comfortably supports the driver's head, and may include a headrest 320 for preventing in advance from damaging a neck bone by momentarily bending a neck back in an event of the collision and may include a backrest 330 through which the driver can lean on a back.

A position of the headrest 320 and a position of the backrest 330 may be independently controlled by the DAS 100 and/or the BCM 51.

The DAS 100 may include a front camera 110, a rear camera 115, a front radar 120, a rear radar 125, and a plurality of corner radars 130.

Referring to FIG. 3, the front camera 110 may have a field of view 110*a* directed to the front of the vehicle 1. The front camera 110 may be installed, for example, on a front windshield of the vehicle 1, but any position may be provided without limitation as long as it has the field of view 110*a* directed to the front of the vehicle 1.

The front camera 110 may image the front of the vehicle 1 and obtain image data regarding the front of the vehicle 1. The image data regarding the front of the vehicle 1 may include information about other vehicles and/or lanes located in front of the vehicle 1.

Referring to FIG. 3, the rear camera 115 may have a field of view 115*a* directed to the rear of the vehicle 1. The rear camera 115 may be installed, for example, on a rear windshield of the vehicle 1, but any position may be provided without limitation as long as it has the field of view 115*a* directed to the rear of the vehicle 1.

The rear camera 115 may image the rear of the vehicle 1 and obtain image data regarding the rear of the vehicle 1. The image data regarding the rear of the vehicle 1 may include information about other vehicles and/or lanes located in rear of the vehicle 1.

The front camera 110 and the rear camera 115 may include a plurality of lenses and an image sensor. The image sensor may include a plurality of photodiodes for converting light into electrical signals, and the plurality of photodiodes may be arranged in a two-dimensional matrix.

The front camera 110 and the rear camera 115 may be electrically connected to a controller 140. For example, the front camera 110 and the rear camera 115 may be connected to the controller 140 through the vehicle communication network NT, through a hard wire, or through a printed circuit board (PCB).

The front camera 110 may transmit the image data regarding the front of the vehicle 1 to the controller 140. The rear camera 115 may transmit the image data regarding the rear of the vehicle 1 to the controller 140.

The front radar 120 may have a field of sensing 120*a* directed to the front of the vehicle 1. The front radar 120 may be installed, for example, on a grille or a bumper of the vehicle 1.

The rear radar 125 may have a field of sensing 125*a* directed to the rear of the vehicle 1. The rear radar 125 may be installed, for example, on a rear bumper of the vehicle 1.

The front radar 120 and the rear radar 125 may include a transmission antenna (or a transmission antenna array) that radiates transmission radio waves to the front and rear of the vehicle 1 and a reception antenna (or a reception antenna array) that receives reflection radio waves reflected from an obstacle. The front radar 120 and the rear radar 125 may obtain front radar data and rear radar data from the transmission radio waves transmitted by the transmission antenna and the reflection radio waves received by the reception antenna. The front radar data and the rear radar data may include position information and velocity information regarding an obstacle, such as other vehicles, pedestrians, or cyclists existing in front and rear of the vehicle 1. The front radar 120 and the rear radar 125 may calculate the relative distance to the obstacle based on the phase difference (or time difference) between the transmission radio waves and the reflection radio waves, and calculate the relative speed of the object based on the frequency difference between the transmission radio waves and the reflected radio waves.

The front radar 120 and the rear radar 125 may be connected to the controller 140 through the vehicle communication network NT, the hard wire, or the PCB. The front radar 120 and the rear radar 125 may transmit the front radar data and the rear radar data to the controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

As illustrated in FIG. 3, the first corner radar 131 may include a field of sensing (FOS) 131*a* oriented to a forward right area of the vehicle 1. For example, the forward-view radar 120 may be mounted to a right side of a front bumper of the vehicle 1. The second corner radar 132 may include an FOS 132*a* oriented to a forward left area of the vehicle 1, and may be mounted to, for example, a left side of the front bumper of the vehicle 1. The third corner radar 133 may include an FOS 133*a* oriented to a rear right area of the vehicle 1, and may be mounted to, for example, a right side of a rear bumper of the vehicle 1. The fourth corner radar 134 may include an FOS 134*a* oriented to a rear left area of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna. The first, second, third, and fourth corner radars 131, 132, 133, and 134 may respectively obtain first corner radar data, second corner radar data, third corner radar data, and fourth corner radar data. The first corner radar data may include information about a distance between the vehicle 1 and the object (e.g., other vehicles, pedestrians, or cyclists) present in a forward right area of the vehicle 1, and information about a speed of the object. The second corner radar data may include information about a distance between the vehicle 1 and an object (e.g., other vehicles, pedestrians, or cyclists) present in a forward left area of the vehicle 1, and information about a speed of the object. The third corner radar data may include information about a distance between the vehicle 1 and an object (e.g., other vehicles, pedestrians, or cyclists) present in a rear right area of the vehicle 1, and information about a speed of the object. The fourth corner radar data may include information about a distance between the vehicle 1 and an object (e.g., other vehicles, pedestrians, or cyclists) present in a rear left area of the vehicle 1, and information about a speed of the object.

Each of the first, second, third, and fourth corner radars 131, 132, 133, and 134 may be connected to the controller 140 through, for example, the vehicle communication network NT, the hard wire, or the PCB. The first, second, third, and fourth corner radars 131, 132, 133, and 134 may respectively transmit first corner radar data, second corner radar data, third corner radar data, and fourth corner radar data to the controller 140.

The controller 140 may include the ECU 101b (see FIG. 1) of the camera module 101 (see FIG. 1) and/or the ECU 102b (see FIG. 1) of the radar module 102 (see FIG. 1), and/or an integrated ECU.

The controller 140 includes a processor 141 and a memory 142.

The processor 141 may process the rear image data of the rear camera 115 and the rear radar data of the rear radar 125 to determine a possibility of the collision of the rear object located at the rear of the vehicle 1. In addition, the processor 141 may generate a control signal for controlling the seat 300 and/or the door 400 in response to processing the rear image data of the rear camera 115 and the rear radar data of the rear radar 125.

In addition, the processor 141 may generate the driving signal, the braking signal, and the steering signal for moving the vehicle 1 in response to processing the rear image data of the rear camera 115 and the rear radar data of the rear radar 125.

In addition, the processor 141 may generate a control signal for controlling the user interface 200 in response to processing the rear image data of the rear camera 115 and the rear radar data of the rear radar 125.

For example, the processor 141 may include an image processor for processing the image data of the cameras 110 and 115 and/or a digital signal processor for processing the radar data of the radars 120, 125 and 130, and/or a micro control unit (MCU) for generating the driving signal, the braking signal, the steering signal, and the control signal for controlling the user interface 200, the seat 300, and the door 400 or a domain control unit (DCU).

The processor 141 may detect the objects (e.g., other vehicles) behind the vehicle 1 based on the rear image data of the rear camera 115 and the rear radar data of the rear radar 125.

In detail, the processor 141 may obtain positions (distances and directions) and relative speeds of the objects behind the vehicle 1 based on rear radar data obtained by the rear radar 125. The processor 141 may obtain position (direction) and type information (e.g., whether the rear object is a truck or a passenger car) of the objects behind the vehicle 1 based on rear image data of the rear camera 115. In addition, the processor 141 may match the objects detected by the rear image data to the objects detected by the rear radar data, and obtain the type information, the position, and relative speed of the rear objects of the vehicle 1 based on a result of the matching.

In addition, as will be described later, the processor 141 may determine the possibility that the vehicle 1 collides with the rear object, and may determine an expected amount of impact due to the collision of the rear object.

Similarly, the processor 141 may process the front image data of the front camera 110, the front radar data of the front radar 120, and side radar data of the corner radars 130, and detects the environment around the vehicle 1.

The memory 142 may store programs and/or data for processing image data by the processor 141, programs and/or data for processing radar data by the processor 141, and programs and/or data for generating the braking signal and/or the steering signal and/or the control signal by the processor 141.

The memory 142 may temporarily memorize the image data received from the cameras 110 and 115 and/or the radar data received from the radars 120, 125, and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The DAS 100 is not limited to that illustrated in FIG. 2, and may further include the LiDAR that scans around the vehicle 1 and detects the object. Further, the DAS 100 may further include an ultrasonic sensor that detects the object by emitting an ultrasonic and receiving a reflected ultrasonic.

Hereinafter, a process by which the controller 140 can prevent damage due to the collision will be described in detail with reference to FIGS. 4 to 8.

Figure 4:
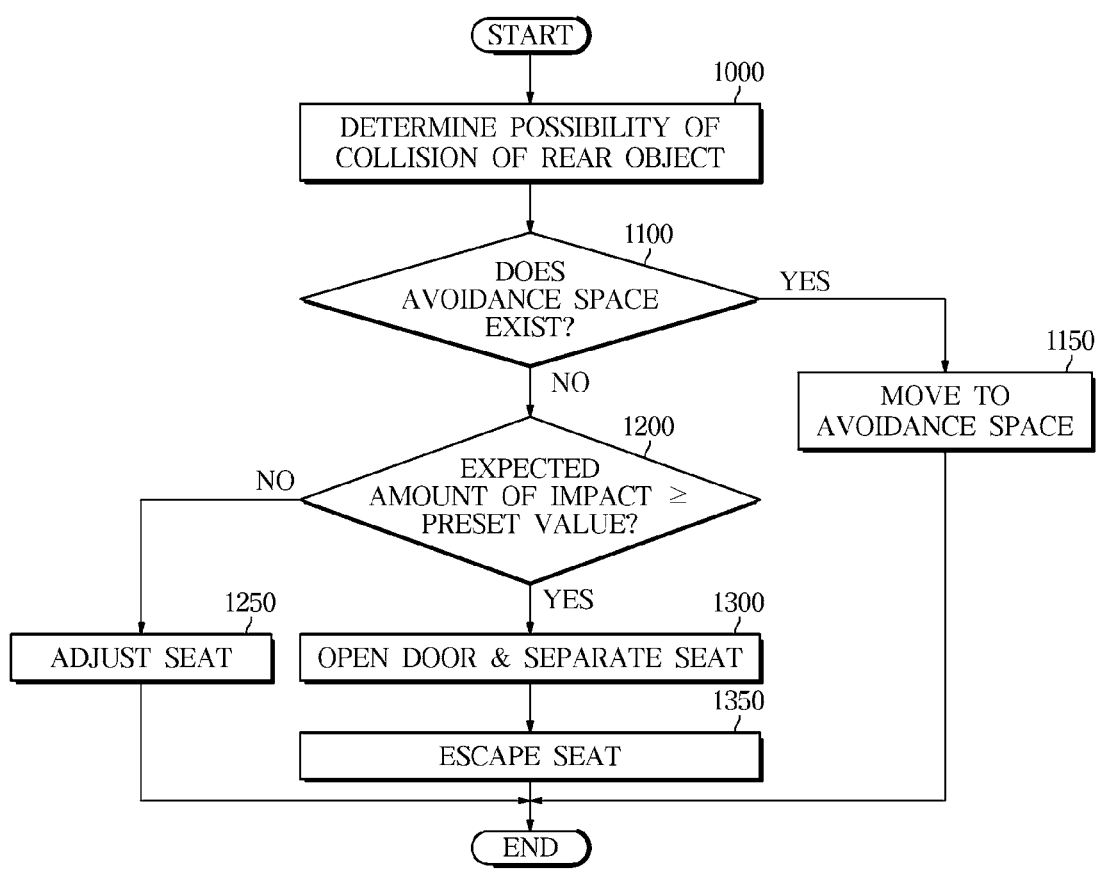
FIG. 4 is a flowchart of a driver assistance method according to an embodiment.
Figure 5:
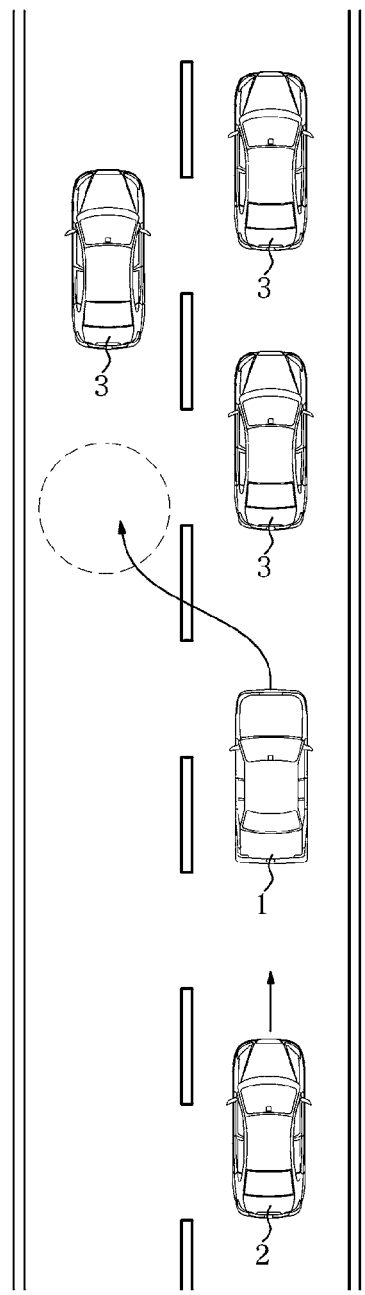
FIG. 5 is a view illustrating a driving path of a vehicle when an avoidance space exists.
Figure 6:
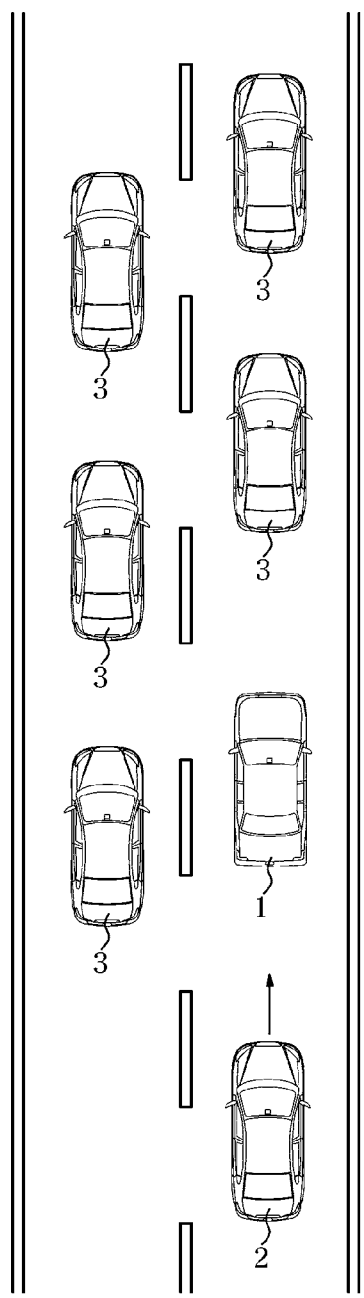
FIG. 6 is a view illustrating a situation in which an avoidance space does not exist.
Figure 7:
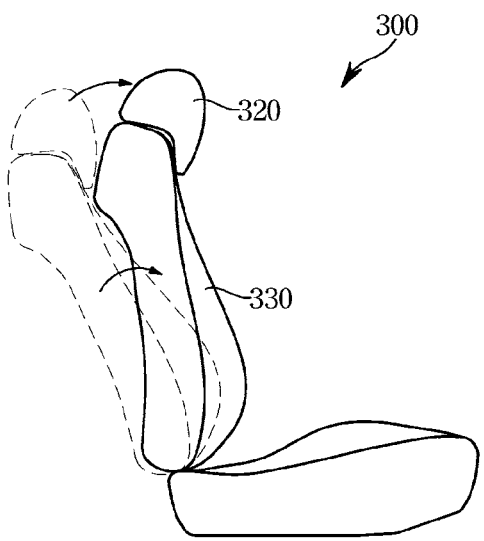
FIG. 7 is a view illustrating a change in a position of a seat when an avoidance space does not exist.
Figure 8:
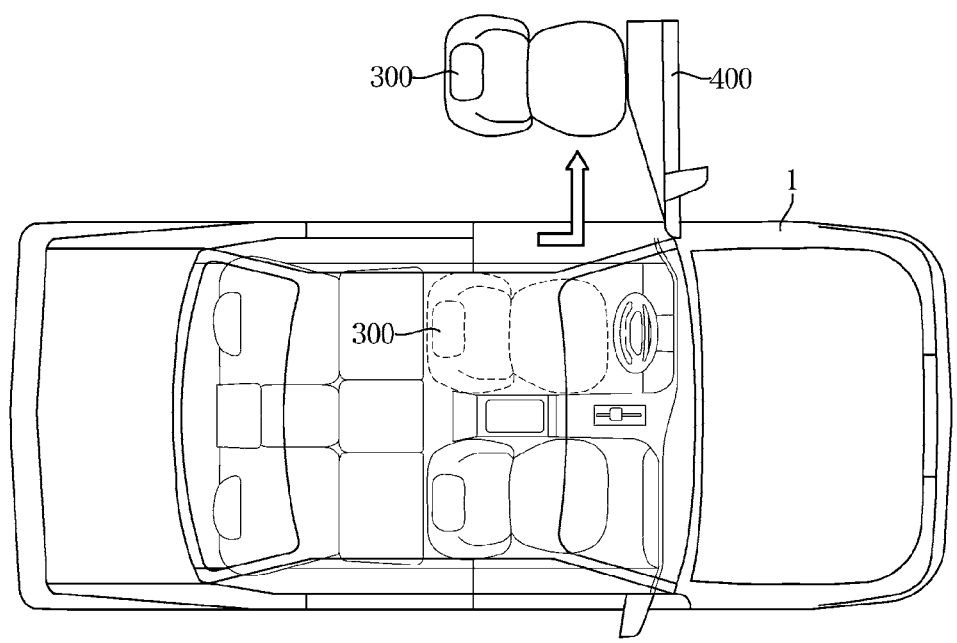
FIG. 8 is a view illustrating an escape process of a seat when an avoidance space does not exist.

FIG. 4 is a flowchart of a driver assistance method according to an embodiment, FIG. 5 is a view illustrating a driving path of a vehicle when an avoidance space exists, FIG. 6 is a view illustrating a situation in which an avoidance space does not exist, FIG. 7 is a view illustrating a change in a position of a seat when an avoidance space does not exist, and FIG. 8 is a view illustrating an escape process of a seat when an avoidance space does not exist.

Referring to FIG. 4, the controller 140 may processes the rear image data and the rear radar data (hereinafter referred to as rear detecting data), and in response to processing the rear image data and the rear detecting data, may determine the possibility of the collision of a rear object 2 located at the rear of the vehicle 1 (1000).

When the collision of the rear object 2 is expected, the controller 140 may search for an avoidance space for avoiding the collision of the rear object 2 (1100).

Particularly, the controller 140 may search for the avoidance space for avoiding the collision of the rear object 2 in response to processing the front image data, the front radar data (hereinafter referred to as front detecting data) and the side radar data (hereinafter referred to as side detecting data).

Referring to FIG. 5, when the collision of the rear vehicle 2 is expected, the controller 140 may determine the positions and the relative speeds of other vehicles 3 located in the front and side of the vehicle 1 based on the front image data, the front detecting data, and the side detecting data, and may search for the avoidance space based on the positions and the relative speeds of other vehicles 3.

The controller 140 may control the vehicle 1 so that the vehicle 1 moves to the avoidance space when the avoidance space exists (YES in 1100) (1150).

That is, the controller 140 may generate the driving signal, the steering signal, and the braking signal that enable the vehicle 1 to move to the avoidance space when there is the avoidance space.

As described above, the vehicle 1 equipped with the DAS 100 according to the embodiment may prevent the collision with the rear object 2 by moving to the avoidance space when there is the avoidance space.

Referring to FIG. 6, since the vehicle 1 is surrounded by other vehicles 3, there is no a space to avoid the collision of the rear vehicle 2. As illustrated in FIG. 6, when the avoidance space does not exist (NO in 1100), the controller 140 may determine the expected amount of impact due to the collision of the rear object 2 based on processing the rear image data and the rear detecting data (1200).

Particularly, the controller 140 may determine the speed of the rear object 2 in response to processing the rear detecting data, determine a size of the rear object 2 in response to processing the rear image data, and determine the expected amount of impact due to the collision of the rear object 2 based on the speed and size of the rear object 2.

As above, since the controller 140 considers the size of the rear object 2, even if the rear object 2 is approaching at the same speed, the expected amount of impact may be calculated differently when the rear object 2 is the passenger car and the dump truck.

The controller 140 may adjust the seat 300 of the vehicle 1 to a preset position when the expected amount of impact due to the collision of the rear object 2 is less than or equal to a preset value (NO in 1200) (1250).

In this case, the preset value may be set to an amount of impact that can be estimated that the driver will be seriously injured.

In addition, the controller 140 may adjust the seat 300 to a preset position so that the driver of the vehicle 1 is in close contact with the seat 300. That is, the preset position may be set so that the driver of the vehicle 1 is in close contact with the seat 300.

Referring to FIG. 7, the preset position may refer to a position in which the headrest 320 of the seat 300 is rotated forward, and a position in which the backrest 330 of the seat 300 is rotated forward.

That is, when the expected amount of impact due to the collision of the rear object 2 is less than the preset value, the controller 140 may rotate the headrest 320 of the seat 300 forward and rotate the backrest 330 of the seat 300 forward.

As described above, when a minor accident is expected, by adjusting the seat 300, the driver and the seat 300 may be brought into close contact and the driver's injury may be prevented.

Referring to FIG. 8, when the expected amount of impact due to the collision of the rear object 2 is greater than the preset value (YES in 1200), the controller 140 may open the door 400 of the vehicle 1, move the seat 300 forward, separate the seat 300 from the vehicle 1 (1300), and may escape the separated seat 300 to the outside of the vehicle 1 through the opened door 400 (1350).

When the expected amount of impact due to the collision is greater than the preset value, since the driver may be seriously injured, it is to escape the driver to the outside of the vehicle 1.

In this case, the controller 140 may open the door 400 of the vehicle 1 by 90 degrees or more. This is because when the door 400 is opened at an angle less than 90 degrees, it is difficult for the seat 300 to escape to the outside of the vehicle 1.

In addition, the controller 140 may prevent the driver from being injured due to falling of the seat 300 by operating the airbag 310 installed in the seat 300 when the separated seat 300 escapes to the outside of the vehicle 1 through the opened door 400.

As described above, when a serious injury to the driver is expected due to the collision, the driver may be escaped from the vehicle 1 to prevent serious injury to the driver.

In addition, when the collision of the rear object 2 is expected, the controller 140 may control the user interface 200 to warn the driver of the collision.

For example, the controller 140 may control the display 210 to output an image warning the driver of the collision, and may control the speaker 220 to output the sound to warn the collision.

According to the disclosed embodiments, it is possible to minimize the damage to the driver that may occur during the collision.

According to the disclosure, it is possible to minimize the damage caused by the collision of the rear object, and it is possible to effectively protect the driver from the collision of the rear object.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for assisting driving of a host vehicle, the apparatus comprising:
a first sensor mounted to the host vehicle and having a field of view in rear of the host vehicle, the first sensor configured to obtain rear image data;
a second sensor selected from a group consisting of a radar sensor and a Light Detection And Ranging (LiDAR) sensor and mounted to the host vehicle, the second sensor configured to have a field of sensing in rear of the host vehicle and obtain rear detecting data; and
a controller including a processor configured to process the rear image data and the rear detecting data,
wherein the controller is configured to:
based on processing the rear image data and the rear detecting data, determine a possibility of a collision of a rear object located at the rear of the host vehicle, and
based on the collision of the rear object being expected, adjust a seat of the host vehicle to a preset position,
wherein the controller is configured to:
determine an expected amount of impact due to the collision of the rear object based on a speed and a size of the rear object, and
based on the expected amount of impact being less than or equal to a preset value, adjust the seat of the host vehicle to the preset position, and
wherein, based on the expected amount of impact being greater than the preset value, the controller is configured to:
open a door of the host vehicle,
separate the seat from the host vehicle, and
escape the separated seat to the outside of the host vehicle through the opened door.

2. The apparatus according to claim 1, wherein the preset position is set so that a driver of the host vehicle is in close contact with the seat.

3. The apparatus according to claim 1, wherein the controller is configured to open the door of the host vehicle to 90 degrees or more.

4. The apparatus according to claim 1, wherein the controller is configured to operate an airbag mounted to the seat based on escaping the separated seat to the outside of the host vehicle through the opened door.

5. The apparatus according to claim 1, wherein the controller is configured to:
based on processing the rear detecting data, determine the speed of the rear object, and
based on processing the rear image data, determine the size of the rear object.

6. The apparatus according to claim 1, wherein the controller is configured to control a user interface of the host vehicle to warn a driver of the collision based on the collision of the rear object being expected.

7. The apparatus according to claim 1, further comprising:
a third sensor mounted to the host vehicle and having a field of view in front of the host vehicle, the third sensor configured to obtain front image data;
a fourth sensor selected from the group consisting of the radar sensor and the LiDAR sensor and mounted to the host vehicle, the fourth sensor configured to have a field of sensing in front of the host vehicle and obtain front detecting data; and
a fifth sensor selected from the group consisting of the radar sensor and the LiDAR sensor and mounted to the host vehicle, the fifth sensor configured to have a field of sensing in side of the host vehicle and obtain side detecting data,
wherein the controller is configured to:
based on processing the front image data, the front detecting data, and the side detecting data, search for an avoidance space to avoid the collision of the rear object, and
control the host vehicle so that the host vehicle moves to the avoidance space.

8. A method for assisting driving of a host vehicle, the method comprising:
obtaining, by a sensor, rear image data and rear detecting data of the host vehicle;
processing, by a controller, the rear image data and the rear detecting data;
determining, by the controller, a possibility of a collision of a rear object located at the rear of the host vehicle based on processing the rear image data and the rear detecting data; and
adjusting, by the controller, a seat of the host vehicle to a preset position based on the collision of the rear object being expected,
wherein the adjusting of the seat of the host vehicle to the preset position based on the collision of the rear object being expected comprises:
determining an expected amount of impact due to the collision of the rear object based on a speed and a size of the rear object; and
adjusting the seat of the host vehicle to the preset position based on the expected amount of impact being less than or equal to a preset value, and
wherein the adjusting the seat of the host vehicle to the preset position based on the collision of the rear object being expected further comprises:
based on the expected amount of impact being greater than the preset value, by controller:
opening a door of the host vehicle,
separating the seat from the host vehicle, and
escaping the separated seat to the outside of the host vehicle through the opened door.

9. The method according to claim 8, wherein the preset position is set so that a driver of the host vehicle is in close contact with the seat.

10. The method according to claim 8, wherein the opening of the door of the host vehicle comprises:
opening the door of the host vehicle to 90 degrees or more.

11. The method according to claim 8, further comprising:
operating, by the controller, an airbag mounted to the seat based on escaping the separated seat to the outside of the host vehicle through the opened door.

12. The method according to claim 8, wherein the determining of the expected amount of impact due to the collision of the rear object based on the speed and the size of the rear object comprises:
determining the speed of the rear object based on processing the rear detecting data; and
determining the size of the rear object based on processing the rear image data.

13. The method according to claim 8, further comprising:
controlling, by the controller, a user interface of the host vehicle to warn a driver of the collision in response to the collision of the rear object being expected.

14. The method according to claim 8, further comprising:
obtaining, by the sensor, front image data, front detecting data, and side detecting data;
searching for, by the controller, an avoidance space to avoid the collision of the rear object based on processing the front image data, the front detecting data, and the side detecting data; and
controlling, by the controller, the host vehicle so that the host vehicle moves to the avoidance space.

15. An apparatus for assisting driving of a host vehicle, the apparatus comprising:
a plurality of first sensors mounted to the host vehicle and having a field of view in rear of the host vehicle, the plurality of first sensors configured to obtain rear image data;
a second sensor mounted to the host vehicle and selected from a group consisting of a radar sensor, a Light Detection And Ranging (LiDAR) sensor and an ultrasonic sensor, the second sensor configured to have a field of sensing in rear of the host vehicle and obtain rear detecting data; and
a controller including a processor configured to process the rear image data,
wherein the controller is configured to:
based on processing the rear image data, determine a possibility of a collision of a rear object located at the rear of the host vehicle, and
based on the collision of the rear object being expected, adjust a seat of the host vehicle to a preset position,
wherein the processor is configured to process the rear detecting data, and the controller is configured to,
based on processing the rear image data and the rear detecting data, determine the possibility of the collision of the rear object,
determine an expected amount of impact due to the collision of the rear object based on a speed and a size of the rear object, and
wherein, based on the expected amount of impact being greater than a preset value, the controller is configured to:
open a door of the host vehicle,
separate the seat from the host vehicle, and
escape the separated seat to the outside of the host vehicle through the opened door.

* * * * *